(12) United States Patent
Takao et al.

(10) Patent No.: US 9,630,372 B2
(45) Date of Patent: Apr. 25, 2017

(54) METHOD OF PRODUCING PRESSED PAPER PIECE AND APPARATUS THEREFOR

(71) Applicants: TOYO SEIKAN GROUP HOLDINGS, LTD., Tokyo (JP); TOKAN KOGYO CO., LTD., Tokyo (JP)

(72) Inventors: Kenichi Takao, Yokohama (JP); Ichiro Kunihiro, Yokohama (JP); Masahiro Ogawa, Yokohama (JP); Seiji Okabe, Tokyo (JP)

(73) Assignees: TOYO SEIKAN GROUP HOLDINGS, LTD., Tokyo (JP); TOKAN KOGYO CO., LTD., Tokyo (JP)

( * ) Notice: Subject to any disclaimer, the term of this patent is extended or adjusted under 35 U.S.C. 154(b) by 286 days.

(21) Appl. No.: 14/371,130

(22) PCT Filed: Jan. 10, 2013

(86) PCT No.: PCT/JP2013/050278
§ 371 (c)(1),
(2) Date: Jul. 8, 2014

(87) PCT Pub. No.: WO2013/114924
PCT Pub. Date: Aug. 8, 2013

(65) Prior Publication Data
US 2015/0008621 A1 Jan. 8, 2015

(30) Foreign Application Priority Data
Jan. 30, 2012 (JP) .................................. 2012-016077

(51) Int. Cl.
*B31F 1/00* (2006.01)
*B29C 57/12* (2006.01)
(Continued)

(52) U.S. Cl.
CPC ............ *B31F 1/0077* (2013.01); *B29C 57/12* (2013.01); *B29D 22/00* (2013.01);
(Continued)

(58) Field of Classification Search
None
See application file for complete search history.

(56) References Cited

U.S. PATENT DOCUMENTS 6,093,460 A 7/2000 Iwaya
6,527,687 B1 3/2003 Fortney et al.
(Continued)

FOREIGN PATENT DOCUMENTS

CN 1736698 A 2/2006
EP 2764991 A1 8/2014
(Continued)

OTHER PUBLICATIONS

JP 2001-270013, machine translation, Oct. 2001.*
International Search Report dated Apr. 23, 2013 issued in corresponding application No. PCT/JP2013/050278.

*Primary Examiner* — Mark Halpern
(74) *Attorney, Agent, or Firm* — Westerman, Hattori, Daniels & Adrian, LLP

(57) ABSTRACT

The objective of the present invention is to provide a method of forming a pressed paper piece by deep drawing a sheet of blank that is primarily made of paper in use of a punch and a die, and a production apparatus for implementing the method, whereby no distinguishable wrinkles are formed in upright portions of the pressed paper piece. The method of producing a pressed paper piece according to the present invention, implemented when deep drawing a sheet-like blank that is primarily made of paper in use of a punch and a die, includes maintaining a predetermined gap between a first blank holder and the die in an outer peripheral region of a process portion of the blank and applying a pressure to a (Continued)

radially inner region thereof via a second blank holder, thereby reducing wrinkling by an effect of integrated functions exerted in both regions of the blank.

4 Claims, 6 Drawing Sheets

(51) Int. Cl.
  B29D 22/00 (2006.01)
  B29K 1/00 (2006.01)
  B29L 31/00 (2006.01)
(52) U.S. Cl.
  CPC ... *B29K 2001/00* (2013.01); *B29L 2031/7132* (2013.01); *B31B 2201/223* (2013.01)

(56) References Cited

U.S. PATENT DOCUMENTS

| | | | | |
|---|---|---|---|---|
| 6,641,515 B2 * | 11/2003 | Ferri | ............ | B31B 43/00 493/143 |
| 7,419,462 B1 * | 9/2008 | Zelinski | ............ | B31B 43/00 271/195 |
| 7,819,790 B2 * | 10/2010 | Grischenko | ............ | B31B 43/00 100/215 |
| 8,734,309 B2 * | 5/2014 | Johns | ............ | B31B 43/00 493/152 |
| 2014/0255630 A1 * | 9/2014 | Kunihiro | ............ | B31B 43/00 428/34.2 |

FOREIGN PATENT DOCUMENTS

| | | | | |
|---|---|---|---|---|
| JP | 10-71656 A | | 3/1998 | |
| JP | 2000-238150 A | | 9/2000 | |
| JP | 2001-270013 A | | 10/2001 | |
| JP | 2001-524403 A | | 12/2001 | |
| JP | 2004-017408 A | | 1/2004 | |
| JP | 2004-154959 A | | 6/2004 | |
| JP | 2011-222809 | * | 10/2011 | ............ B65D 1/265 |
| KR | 2011-0030179 A | | 3/2011 | |

* cited by examiner

METHOD OF PRODUCING PRESSED PAPER PIECE AND APPARATUS THEREFOR

This application is a 371 of PCT/JP2013/050278 filed 10 Jan. 2013

TECHNICAL FIELD

The present invention relates to a method of producing a pressed paper piece with less wrinkling, and an apparatus for implementing the production method.

BACKGROUND ART

Pressed paper products have hitherto been universally used as various forms of containers in the field of packaging and containers. There are one-piece pressed paper items such as paper trays or paper dishes, and two-piece containers such as paper cups formed of a body member and a bottom member.

Pressed paper pieces formed by deep drawing a blank that is primarily made of paper lack malleability and ductility unlike metals and the blank tends to wrinkle in upright portions along the peripheral edge, as the paper material is gathered together with the reduction in diameter during the deep drawing process. FIG. 6 shows a common structure of a two-piece paper cup consisting of a body member X and a bottom member Y. The bottom member, which is the pressed paper piece, is formed by deep drawing. As shown in the drawing, the lower end of the body member is folded back, and the bottom member is jointed thereto by bonding, with the side wall of the bottom member being sandwiched between the folded back portions. Any wrinkles that are so large as to be folded over in the side wall will cause an insufficient bond because of gaps in the bonded surfaces. Such an insufficient bond would cause no problem if the paper cup is disposed after holding a content liquid that is immediately consumed. The paper cup, though, could not withstand a long-term use as a container. The following techniques are conventional methods of reducing wrinkles in pressed paper pieces for ensuring that a good bond is formed.

Patent Document 1 discloses a method of producing a bottom piece for paper cups, with an aim to produce a cup bottom such that no wrinkles that are so large as to be folded over are formed when compressing the rim of the bottom piece. The method includes: applying a clamping force to an outer peripheral portion of a thick circular paper stock; pressing a central portion of the paper stock into a circular opening with a smaller diameter than that of the paper stock while maintaining the clamping force to prevent displacement of the outer peripheral portion, thereby to stretch the paper stock; forming the rim, after the previous step of stretching the paper stock, by reducing the clamping force gradually and letting the outer peripheral portion enter the opening and bend so that it extends substantially orthogonal to the central portion.

Patent Document 2 aims at providing a leakage-proof bottom paper piece fitted and bonded to a body section of a paper cup, and shows a configuration wherein a through hole (female mold) is formed in a mold section, and an annular pressing member driven by a coil spring is arranged to press a bent portion of the bottom paper piece against a stepped surface of the mold section. With the bent portion being pressed by the pressing member, a punch (male mold) is activated to deep draw the bottom paper piece. With this configuration, as the bottom piece is gradually deep drawn while an outer side of its bent portion is held down, narrow pleats-like, easily-crushable folds are formed in the bent portion. As a result, when joined by applying pressure, the bottom piece forms a favorable tight bond with the body section, and thus highly water-proof paper cup can be obtained.

Patent Document 1: Japanese Patent Application Laid-open No. 2000-238150 "Paper cup bottom and method and apparatus for forming same", published on Sep. 5, 2000

Patent Document 2: Japanese Patent Application Laid-open No. 2001-270013 "Apparatus and method for forming bottom paper sheet of paper cup" published on Oct. 2, 2001

DISCLOSURE OF THE INVENTION

For the pressed paper pieces made by the conventional method of deep drawing while pressure is applied to the outer rim of the circular blank, various techniques have been proposed such as forming small wrinkles so as to form readily crushable folded parts, or inserting the paper blank into a gap that is smaller than the thickness of the blank during the deep drawing to crush small wrinkles and to make them less notable. However, none of these processes has been proven effective to completely eliminate wrinkles.

Paper containers used in the field of food and drink containers for a longer term than a normal storage period, i.e., long-life containers, are generally sterilized with the use of a pharmaceutical agent. If the bottom member with wrinkles in the side wall thereof is bonded to the body member, there will be gaps near the joint between the side wall of the bottom member and the body member on the side that contacts the contents, and this may cause problems such as insufficient sterilization due to the pharmaceutical agent failing to reach these parts, or the pharmaceutical agent staying behind, or leakage of contents. A forming method that can solve these problems and a production apparatus for implementing this method are thus sought after.

An object of the present invention is to provide a method of forming a pressed paper piece by deep drawing a sheet of blank that is primarily made of paper using a punch and a die, and a production apparatus for implementing the method, whereby the problems described above are resolved, i.e., no distinguishable wrinkles are formed in upright portions of the pressed paper piece.

The method of producing a pressed paper piece according to the present invention, implemented when deep drawing a sheet-like blank that is primarily made of paper in use of a punch and a die, includes: maintaining a predetermined gap between a first blank holder and the die in an outer peripheral region of a process portion of the blank and applying a pressure to a radially inner region thereof via a second blank holder, thereby reduce wrinkling by an effect of integrated functions working in both regions of the blank.

The apparatus for producing a pressed paper piece by deep drawing a sheet-like blank that is primarily made of paper in use of a punch and a die, according to the present invention, includes: means for maintaining a constant gap S between a lower surface of a first blank holder and an upper surface of the die during deep drawing, with the first blank holder being arranged in an outer peripheral region of a process portion of the blank, and a second blank holder having pressing means being arranged in a radially inner region of the process portion of the blank, wherein, when the sheet-like blank is not present, the second blank holder has a lower surface protruding more than the lower surface of the first blank holder, with a difference Z therebetween being S—T≤Z<S, where T is the thickness of the blank.

In the apparatus for producing a pressed paper piece according to the present invention, in addition to the configuration described above, the first blank holder has a sharp outer circumferential edge that serves as a cutter for cutting the blank.

The apparatus for producing a pressed paper piece according to the present invention further includes a lubricating oil supply member for lubricating the upper surface of the die arranged opposite a lower end face of the first blank holder.

The method of producing a pressed paper piece according to the present invention employs a configuration in which the gap between the blank holder and the die is maintained constant in an outer peripheral region of a process portion of the blank. As deep drawing advances, the outer peripheral portion of the blank is reduced in diameter, causing the blank to wrinkle, i.e., causing the blank surface to warp, or causing the blank to increase its thickness, so that the lower end face of the first blank holder that was not in contact with the surface of the blank at first comes to contact with the blank, whereby formation of wrinkles, and in particular large wrinkles, is effectively prevented. This outer peripheral portion of the process portion of the blank corresponds to the side wall portion of the finished paper piece that is radially compressed most and therefore prone to wrinkle, and therefore preventing the wrinkling that occurs in an early stage of the process with this first blank holder is of substantial technical significance. The second blank holder, moreover, that is located in the radially inner region thereof, applies pressure to a portion that will be the upright portion of the pressed paper piece, to prevent wrinkling in the middle stage of the process, which is important to ensure a good bond with the body member and to prevent formation of gaps near the joint. According to the present invention, wrinkling is reduced by integration of these functions of both blank holders, so that, even if there are variations in blank thickness or fiber direction, the blank holder that applies pressure in the inner peripheral region during the deep drawing acts to reduce buckling (wrinkling) caused by the circumferential compressive stress applied to the outer peripheral portion of the blank in shrink flanging. Compared to the conventional method of applying pressure to the entire outer peripheral region, only the second blank holder applies pressure according to the present invention, so that friction is reduced, as a result of which the pressed paper piece is subjected to less load during the process and is less likely to break.

Thus a desired pressed paper piece can be produced, as wrinkling caused by insufficient pressure application, and rupture caused by excessive pressure application, are effectively prevented.

The apparatus for producing a pressed paper piece according to the present invention includes, as described above, means for pressing a sheet-like blank arranged in an outer peripheral region of a process portion of the blank, wherein a first blank holder that maintains a constant gap S between a lower surface thereof and an upper surface of the die during deep drawing, and a second blank holder arranged in a radially inner region thereof to apply pressure to the sheet-like blank between itself and the upper surface of the die, are arranged. When the sheet-like blank is not present, the lower surface of the second blank holder protrudes more than the lower surface of the first blank holder with a difference Z being S−T≤Z<S, where T is the thickness of the blank. The relationship above defines the condition with which wrinkle reducing pressure is applied by the second blank holder during deep drawing and collision between the second blank holder and the top surface of the die does not occur. Processing under a setting in which the second blank holder collides the top surface of the die raises the risk of pinching and of formation of streamers and fines, and collisions that occur repeatedly, immediately after each deep drawing and during no-load operation, lead to deterioration of tool durability. The present invention thus applies the condition above to avoid these problems.

In the apparatus for producing a pressed paper piece according to the present invention, at the beginning of deep drawing, only the second blank holder presses the outer peripheral region of the process portion of the blank, but as deep drawing advances, the outer peripheral portion of the blank is reduced in diameter and gathered together, causing the blank to wrinkle, i.e., causing the blank surface to warp, or causing the blank to increase its thickness, and when the warping or increased thickness exceeds the size of the gap S, the first blank holder eventually applies pressure for the wrinkle reducing effect. Since the gap S between the lower surface of the first blank holder and the upper surface of the die is maintained constant, the first blank holder thus prevents wrinkling that occurs in an early stage of the process. As the process proceeds further, the blank material disappears from the region pressed by the first blank holder, and in the latter half of the process, the pressure is only applied by the second blank holder. With the apparatus for producing a pressed paper piece according to the present invention, by these effects described above, a pressed paper piece can be processed while formation of distinguishable wrinkles in the upright portion of the pressed paper piece is effectively prevented.

In the apparatus for producing a pressed paper piece according to the present invention, in addition to the configuration described above, the first blank holder has a sharp outer circumferential edge to serve as a cutter for cutting the blank, so that the apparatus is made compact.

Moreover, in the apparatus for producing a pressed paper piece according to the present invention, a lubricating oil supply member for lubricating the upper surface of the die is arranged opposite the lower end face of the first blank holder. Thereby, an appropriate amount of lubricating oil is applied on the lower surface of the blank, so that friction between the die and blank surfaces is reduced, to enable smooth deep drawing.

EXPLANATION OF REFERENCE NUMERALS

Figure 1:
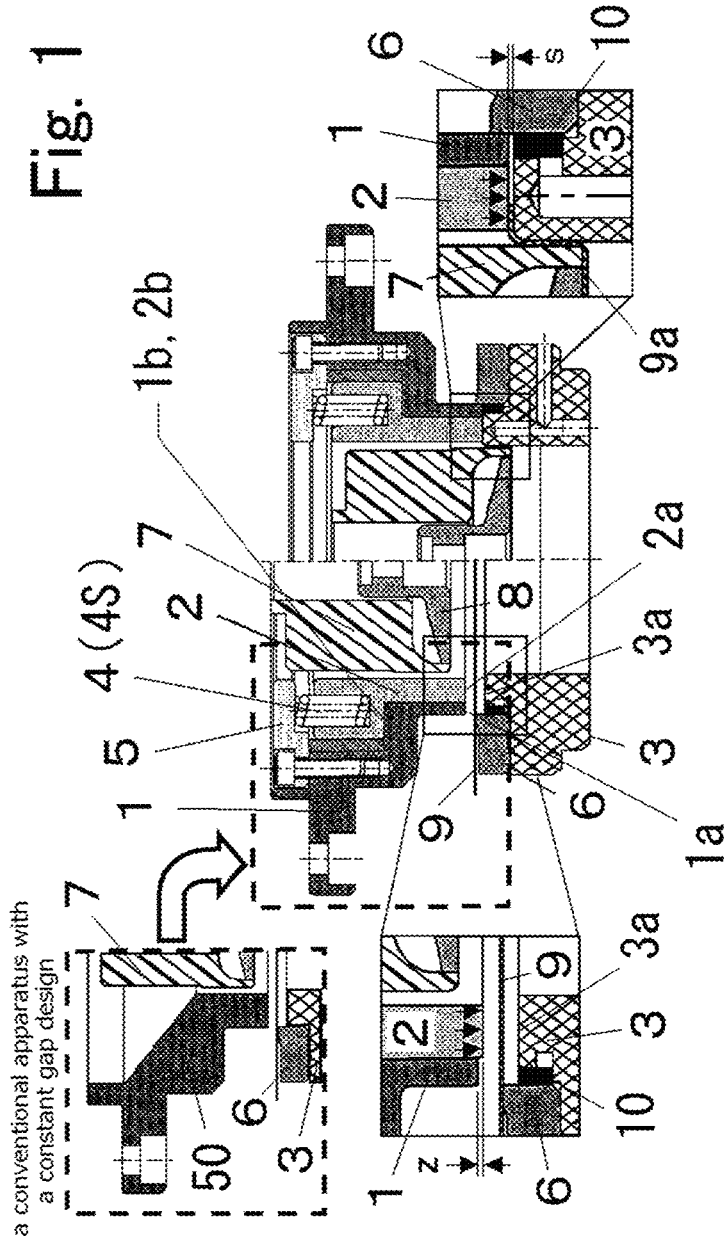
FIG. 1 is a diagram illustrating an embodiment of the apparatus of the present invention.

1: first blank holder
1a: lower end face of first blank holder
1b: stepped portion of first blank holder
2: second blank holder
2a: lower end face of second blank holder
2b: stepped portion of second blank holder 3: die
3a: upper surface of die
4: pressure application mechanism
4S: spring
5: backing member
6: cutter
7: punch
8: ejector member
9: sheet-like paper material
9a: blank
10: lubricating oil supply felt
50: pressing member with a constant gap of conventional apparatus

BEST MODE FOR CARRYING OUT THE INVENTION

FIG. 1 shows the structure of processing parts of the apparatus for producing the pressed paper piece according to the present invention in cross section. The left side of the central part shows a state before the processing, while the right side shows a state during the processing. The lower left and right diagrams each show enlarged views of essential parts, while the upper left diagram shows part of the structure of a conventional apparatus with a constant gap design. Reference numeral 1 denotes a first blank holder, and 2 denotes a second blank holder. The second blank holder 2 is arranged on the inner side of the first blank holder 1, and their lower end faces are opposite the upper surface 3a of a die 3. A pressure application mechanism 4 is disposed in this second blank holder 2 to apply a constant pressure. In the example of configuration shown here, the pressure application mechanism 4 is a spring 4s arranged between a backing member 5 integral with the first blank holder 1 and the second blank holder 2. While a spring is used as the pressure application mechanism in this configuration, a pneumatic cylinder, a hydraulic cylinder, or an elastic member such as rubber may also be used depending on the pressure application capability and apparatus size.

Reference numeral 6 denotes an annular cutter placed on the upper surface on the outer side of the die 3, which punches out a blank from a sheet-like paper material in cooperation with the first blank holder 1. The first blank holder 1 has a sharp outer circumferential edge so that the paper material is cut clean. Reference numeral 7 denotes a deep drawing punch, and 8 denotes an ejector member fitted inside the lower end of the punch for removing the pressed product from the die 3. In the state before the processing in which the lower end faces 1a and 2a of the first and second blank holders 1 and 2 are not in contact with the paper material 9, the second blank holder 2 is pressed downward with a predetermined force by the spring 4s arranged between the backing member 5 integrally formed to the first blank holder 1 and the second blank holder 2, as shown on the left side of the central part of the drawing. The first and second blank holders 1 and 2 engage with each other at their stepped portions 1b and 2b so that, as can be seen from the enlarged view shown in the lower left, the lower end face 2a of the second blank holder 2 is located lower by a difference Z than the lower end face 1a of the first blank holder 1. In the state in which the first blank holder 1 has moved downward to punch out a blank 9a, or a piece that is going to be processed, from the sheet-like paper material 9, as can be seen from the enlarged view shown in the lower right, a constant gap S is maintained between the lower end face 1a of the first blank holder 1 and the upper surface of the die 3. With the first and second blank holders 1 and 2 employing the configurations described above, the apparatus could be designed to produce pressed paper pieces of desired shapes without substantial remodeling of the conventional apparatus, as there was no need to change the outer shape of the pressing member 50 with a constant gap of the conventional apparatus with a constant gap design shown in the upper left of the drawing.

Reference numeral 10 in the drawing denotes an annular lubricating oil supply felt arranged on the inner side of the annular cutter 6 such that its upper surface is at the same height as, and continuous with, the upper surface 3a of the die 3. While a felt is used as the lubricating oil supply member in this configuration, a porous member (metal, ceramics, plastics, and so on), or an annular oil groove, for example, may also be used.

The lubricating oil supply member should preferably have a smaller width than the width of the first blank holder 1. This is because, if the lubricating oil supply member has a larger width than that of the first blank holder 1 and is made of a soft material such as felt, the pressure from the second blank holder 2 fails to be properly applied, as a result of which the intended effect of reducing wrinkles may not be achieved, and also the lubricating oil supply member itself may be damaged.

Figure 2:
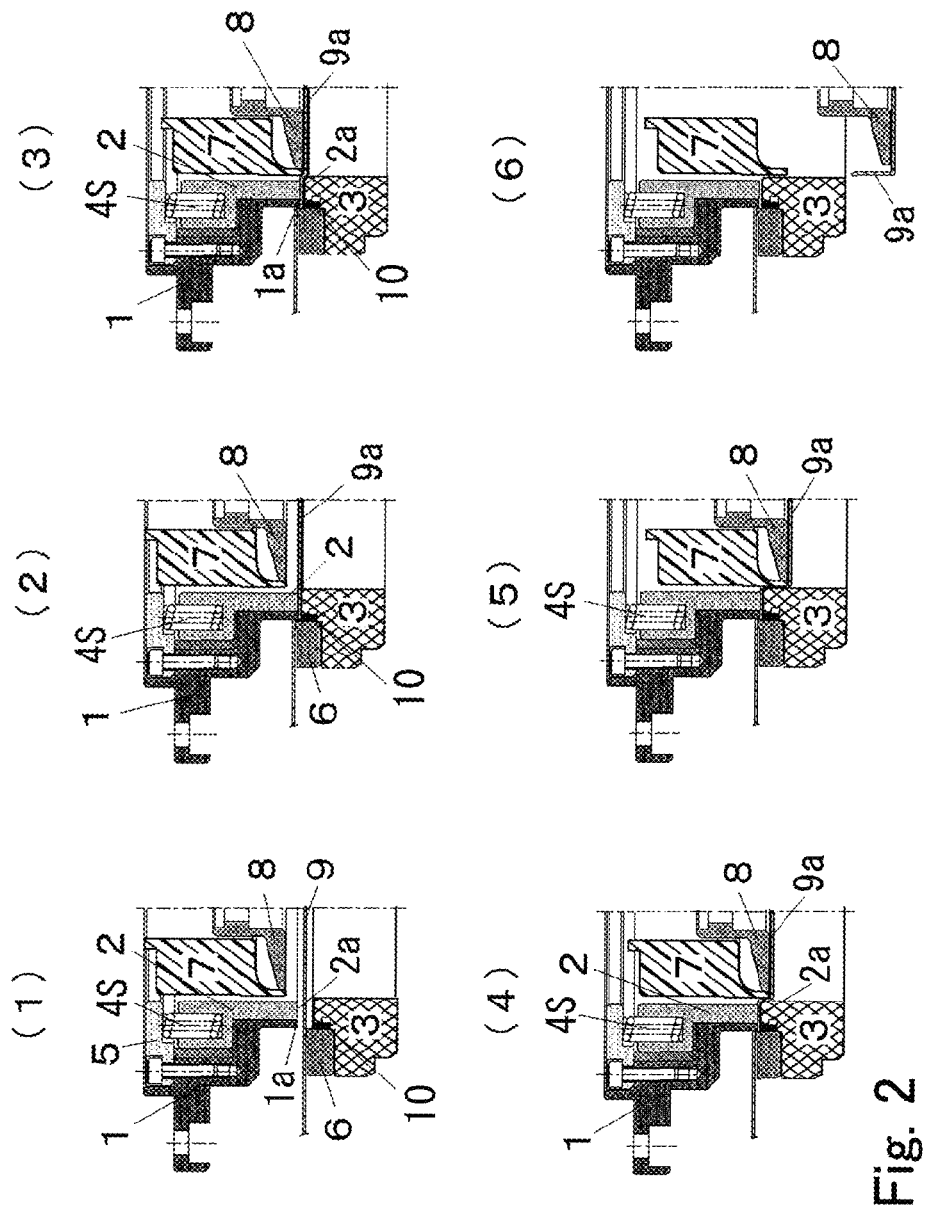
FIG. 2 is a diagram for explaining the forming process according to the present invention.

The operation according to the present invention will be described with reference to FIG. 2. State (1) is the initial state where the sheet-like paper material 9 has been fed to and placed on the upper surface of the cutter 6. The first blank holder 1, second blank holder 2, deep drawing punch 7, and ejector member 8 are located at positions above the sheet-like paper material 9. State (2) shows a blank 9a, or a piece that is going to be processed, punched out from the sheet-like paper material 9. The first and second blank holders 1 and 2 are integrally moved downward so that the cutter 6 punches out a circular blank 9a from the sheet-like paper material 9 in cooperation with the first blank holder 1. At this time, as mentioned above, a constant gap S is maintained between the lower end face 1a of the first blank holder 1 and the upper surface of the die 3 (see FIG. 1), and the lower end face 2a of the second blank holder 2 is located lower by a difference Z than the lower end face 1a of the first blank holder 1, so that the relationship of S≤T+Z is established, wherein T is the thickness of the sheet-like paper material 9 (see FIG. 1). Therefore, the lower end face 1a of the first blank holder 1 is not in contact with the surface of the sheet-like paper material 9, while the lower end face 2a of the second blank holder 2 is applying a pressure on the surface of the sheet-like paper material 9 as given by the spring 4s. With this pressure being applied to the periphery of the circular blank 9a by the second blank holder 2, the process proceeds to an initial step of deep drawing shown as State (3). In this step, the deep drawing punch 7 and the ejector member 8 are integrally lowered to press a central portion of the blank 9a against the inner circumferential surface of the die 3 to start deep drawing. At first the first blank holder 1 has no bearing on the blank 9a since its lower end face 1a is not in contact with the surface of the blank 9a. As deep drawing advances, however, the outer peripheral portion of the blank 9a is reduced in diameter, causing the blank to wrinkle and the blank surface to warp or causing the blank to increase its thickness, and eventually contacts the lower end face 1a of the first blank holder 1. This contact effectively prevents large wrinkles from being formed during wrinkling.

At this point, the lubricating oil supply felt 10 is in contact with the lower face of the outer peripheral portion of the blank 9a and applying lubricating oil in this region. As deep drawing proceeds, the blank 9*a* reduces in diameter, and its outer peripheral portion moves from a region under the lower end face 1*a* of the first blank holder 1 to the region under the lower end face 2*a* of the second blank holder 2, so that lubricating oil is distributed entirely over the area where the die 3 contacts the blank 9*a*, to reduce contact friction.

State (4) shows a middle step of the deep drawing process. The punch 7 and the ejector member 8 are integrally lowered further into the die 3 and the side wall of the bottom member is being formed between the punch and die. Deep drawing proceeds, with a constant pressure being applied on the outer peripheral portion of the blank 9*a* on the upper surface of the die 3 from the lower end face 2*a* of the second blank holder 2 as given by the spring 4*s*. It is the major characteristics of the present invention that this pressure provided by the spring 4*s* is always constant irrespective of the thickness of the blank 9*a*. In the conventional apparatus wherein the gap between the blank holder and the upper surface of the die was constant, the pressure applied on the outer peripheral portion of the blank 9*a* varied depending on the variations in thickness of the material of the blank 9*a* itself or changes of thickness during the process, which caused problems such as rupture or insufficient pressure application. The present invention employs a pressure application mechanism 4, which is the spring 4*s* in this embodiment, whereby a constant pressure is applied even if the thickness of the blank 9*a* varies, so that thickness variations are absorbed by displacement of the second blank holder 2. State (5) shows the last step of the deep drawing process. The outer peripheral portion of the blank 9*a* has come off of the lower end face 2*a* of the second blank holder 2 and been drawn onto the inner circumferential surface of the die 3 to be the side wall of the bottom member, whereupon the deep drawing is complete. State (6) shows the removal of the pressed paper piece (bottom member in this embodiment) that has been deep drawn from the die. The ejector member 8, which was fitted in the punch 7, separates from the punch 7 and moves downward independently, to eject the pressed paper piece formed inside of the die 3. After deep drawn, the pressed paper piece thus obtained according to the present invention, although not shown, is then inserted into a tubular body member, and the wall portion of the pressed paper piece is joined to the side wall of the body member to produce a paper container.

Examples

A comparison was made of an already commercially available pressed paper piece produced by a conventional method (Conventional product 1), a pressed paper piece formed by the method described in Japanese Patent Application Laid-open No. 2001-270013 (Conventional product 2), and the pressed paper piece made by the production method of the present invention.

Paper stock with a base weight of 200 g/m$^2$ and laminated on each side with polyethylene was used as the blank, and a paraffin-based adhesive was used during forming. The adhesive is one that is commonly used for paper cups. A spring mechanism was employed for the mechanism that allows displacement of the blank holder relative to the top surface of the die 1 while a constant pressure is being applied to the outer peripheral portion of the blank 9*a*. The following other conditions were set the same:

[Shared Conditions]
Blank diameter: 065 mm
Blank thickness: T=0.37 mm
Die hole diameter: φ47.1 mm
Die shoulder radius: 1.5 mm
Punch outer diameter: φ46.0 mm
Pressing speed: about 360 mm/sec Next, the working conditions of the present invention, Conventional product (1), and Conventional product (2) are shown in Table 1. "Wrinkle reducing pressure" here refers to the pressure applied from the second blank holder to the blank in an early stage of the processing.

TABLE 1

|  |  | Present Invention | Conventional Product (1) | Conventional Product (2) |
|---|---|---|---|---|
| Wrinkle Reducing Method | First Blank holder | Present | Absent | Integral |
|  | Second Blank holder | Present | Present |  |
| Size Of First Blank holder | Outer Diameter | φ65 mm | — | φ65 mm |
|  | Inner Diameter | φ56.2 mm | — | — |
| Size Of Second Blank holder | Outer Diameter | φ56 mm | φ56 mm | — |
|  | Inner Diameter | φ48 mm | φ48 mm | φ48 mm |
| Gap S Between Die Upper Surface And First Blank holder |  | 0.38 mm | — | 1.00 mm |
| Difference Z |  | 0.05 mm | — | — |
| Wrinkle Reducing Pressure |  | 3.3 MPa | 3.3 MPa | — |

Mechanical properties of deep drawn pieces of paper blank differ depending on the orientation of paper fibers. As the paper is made by flowing pulp through the paper making machine in a predetermined direction, the fibers tend to align themselves with the advancing direction, which is called the "grain direction of paper". The sheet-like paper material 9 in the present invention is fed along this grain direction of paper, i.e., along the direction in which the fibers are aligned, and this direction will hereinafter be referred to as "MD direction", while the direction orthogonal thereto will be referred to as "CD direction". The paper is intrinsically strong in the MD direction as it hardly stretches in this direction, while it can stretch and is easy to break and wrinkle in the CD direction.

Figure 3:
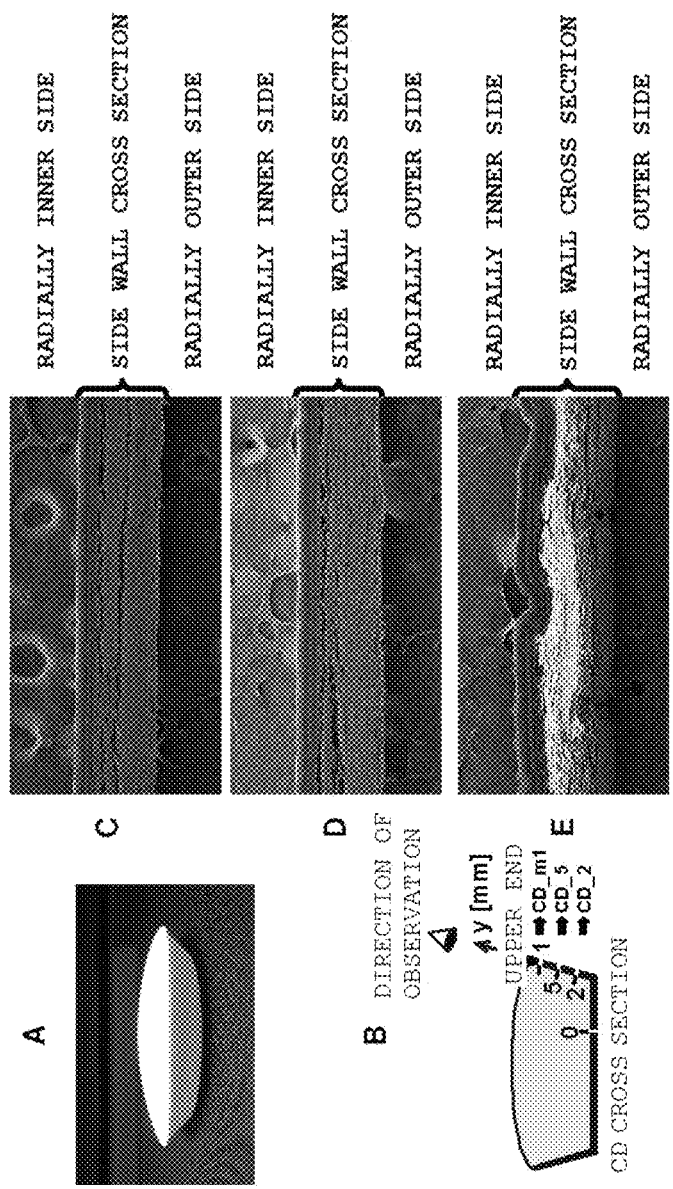
FIG. 3 shows results of analysis from a CD direction of a product processed according to the present invention.

In FIG. 3, A is a photograph taken from the CD direction of the pressed paper piece of the present invention. Pictures were taken only from the CD direction, in consideration of the paper characteristics noted above, as wrinkling is more likely to occur in the CD direction. The paper piece has a smooth surface and no wrinkles are visually perceptible. For more detailed evaluation, it was observed with a scanning electron microscope at 50 times magnification.

In FIGS. 3, C, D, and E are microscopic photographs of a side wall cross section at 2 mm height from the bottom (CD_2), a side wall cross section at 5 mm height from the bottom (CD_5), and a side wall cross section at 1 mm height from the upper end (CD_m1), as indicated in diagram B. All the cross sections were observed from the upper end side. No wrinkles are found in CD_2 and CD_5. In CD_m1, although fine dents were perceptible, no folded-over portions were present.

Figure 4:
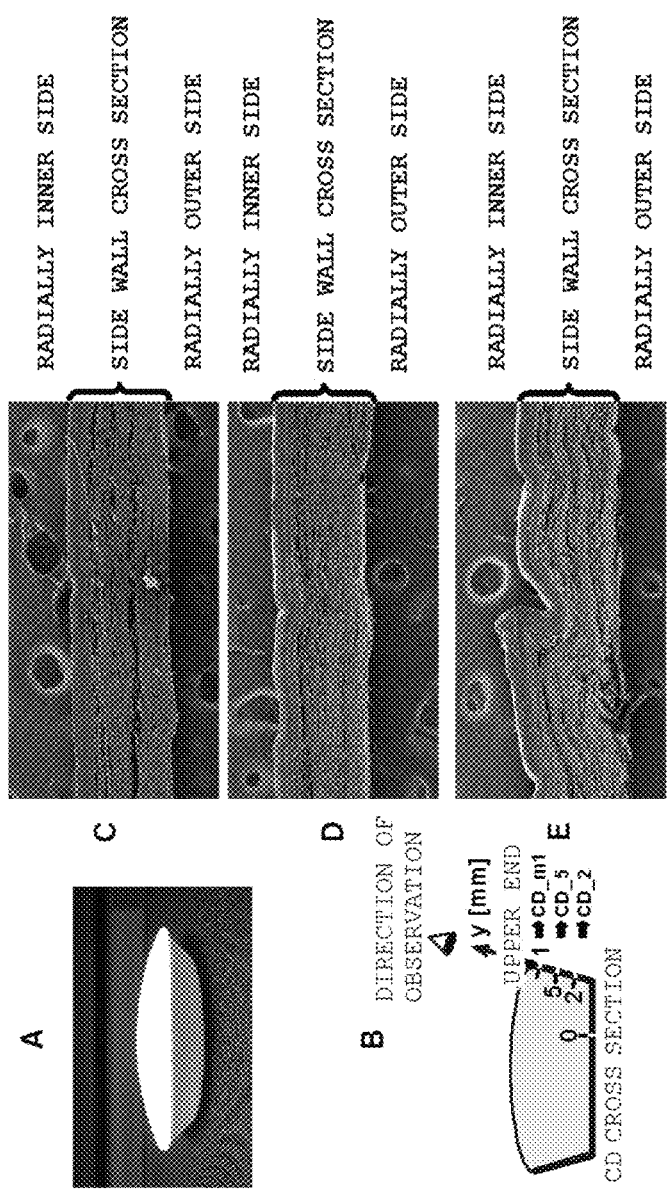
FIG. 4 shows results of analysis from a CD direction of a conventional product (1)

In FIG. 4, A is a photograph taken from the CD direction of Conventional product (1). Wrinkles are visually perceptible. Similar observation revealed that small dents were present in CD_5, which developed into wrinkles in CD_m1 larger than those at the corresponding position of the pressed paper piece of the present invention.

Figure 5:
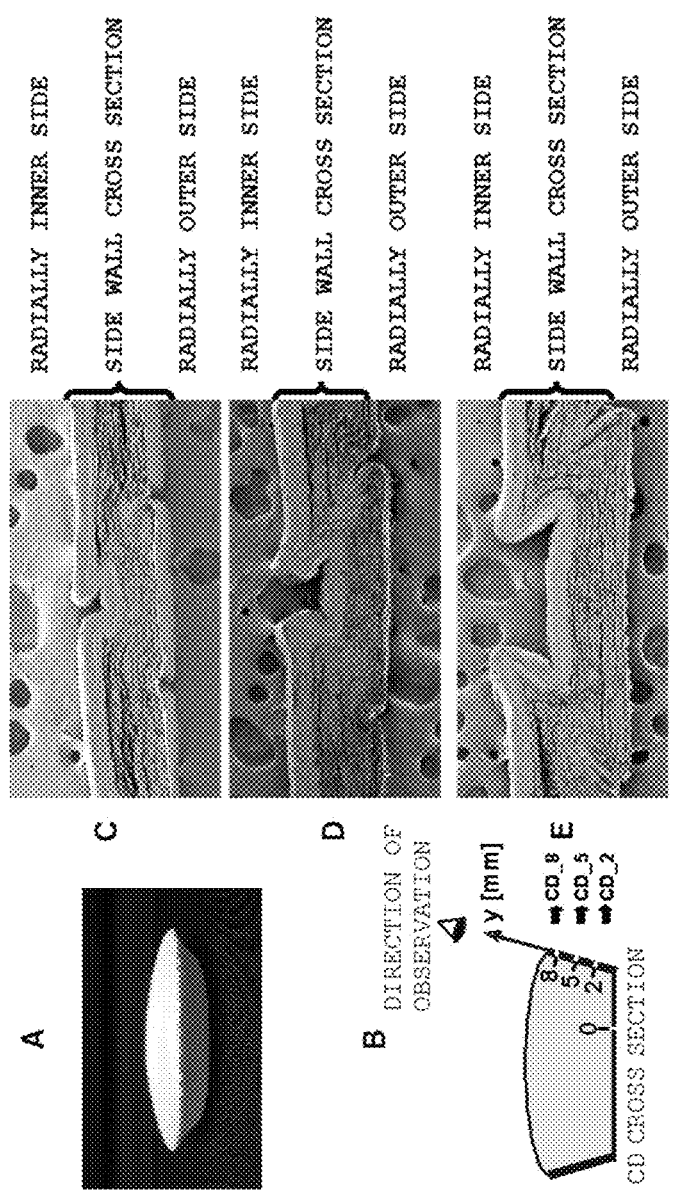
FIG. 5 shows results of analysis from a CD direction of a conventional product (2)
Figure 6:
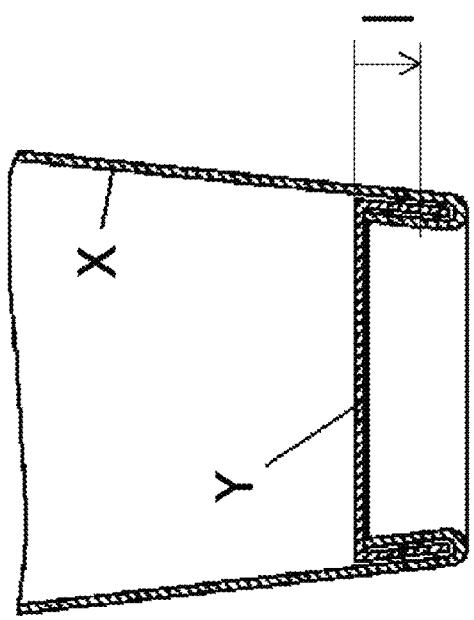
FIG. 6 is a diagram for explaining the structure of a two-piece paper cup.

In FIG. 5, A is a photograph taken from the CD direction of Conventional product (2). Large wrinkles are clearly visible. Observation was made similarly except that, instead of CD_m1 as in FIG. 3, the cross section of the side wall at 8 mm height from the bottom (CD_8) was observed, which revealed that large, distinguished wrinkles had formed in all the cross sections.

As shown by the results described above, the pressed paper piece of the present invention not only has a better finished surface but also has much less wrinkling than conventional products, which enables a reliable bond to be formed with another component such as a body member without cavities or the like in the adhesive layer, and so a desirable paper container that can withstand long-life applications can be provided.

INDUSTRIAL APPLICABILITY

Although the invention has been described herein with respect to an example of forming the bottom part of a paper container such as a paper cup, the invention is not limited to the bottom part of two-piece paper containers but may also be applied to one-piece paper containers with side walls of a small height such as paper dishes or paper trays. The pressed paper piece or paper container of the present invention may contain drinks such as milk, milk for use in portions, coffee, or food products such as jam, yogurt, cheese, butter, ice cream, or snack food.

The invention claimed is:

1. An apparatus for producing a pressed paper piece by deep drawing a sheet-like blank that is primarily made of paper in use of a punch and a die, the apparatus comprising:
    means for maintaining a predetermined gap S between a lower surface of a first blank holder and an upper surface of the die during deep drawing, with the first blank holder being arranged in an outer peripheral region of a process portion of the blank, and a second blank holder having pressing means being arranged in a radially inner region in the process portion of the blank,
    wherein the second blank holder has a lower surface protruding more than the lower surface of the first blank holder, with a difference Z therebetween being $S-T \leq Z < S$, where T is the thickness of the blank.

2. The apparatus for producing a pressed paper piece according to claim 1, wherein the first blank holder has a sharp outer circumferential edge that also serves as a cutter for cutting the blank.

3. The apparatus for producing a pressed paper piece according to claim 2, further comprising a lubricating oil supply member for lubricating the upper surface of the die arranged opposite a lower end face of the first blank holder.

4. The apparatus for producing a pressed paper piece according to claim 1, further comprising a lubricating oil supply member for lubricating the upper surface of the die arranged opposite a lower end face of the first blank holder.

* * * * *